INVENTORS
WILFORD H. TEETER
AND
CHARLES E. WARING.

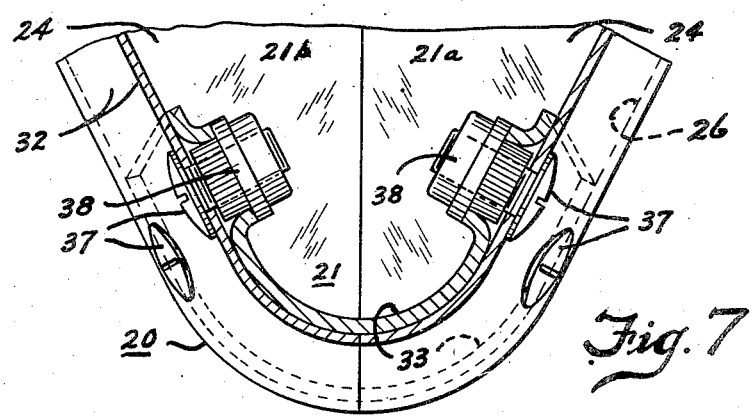
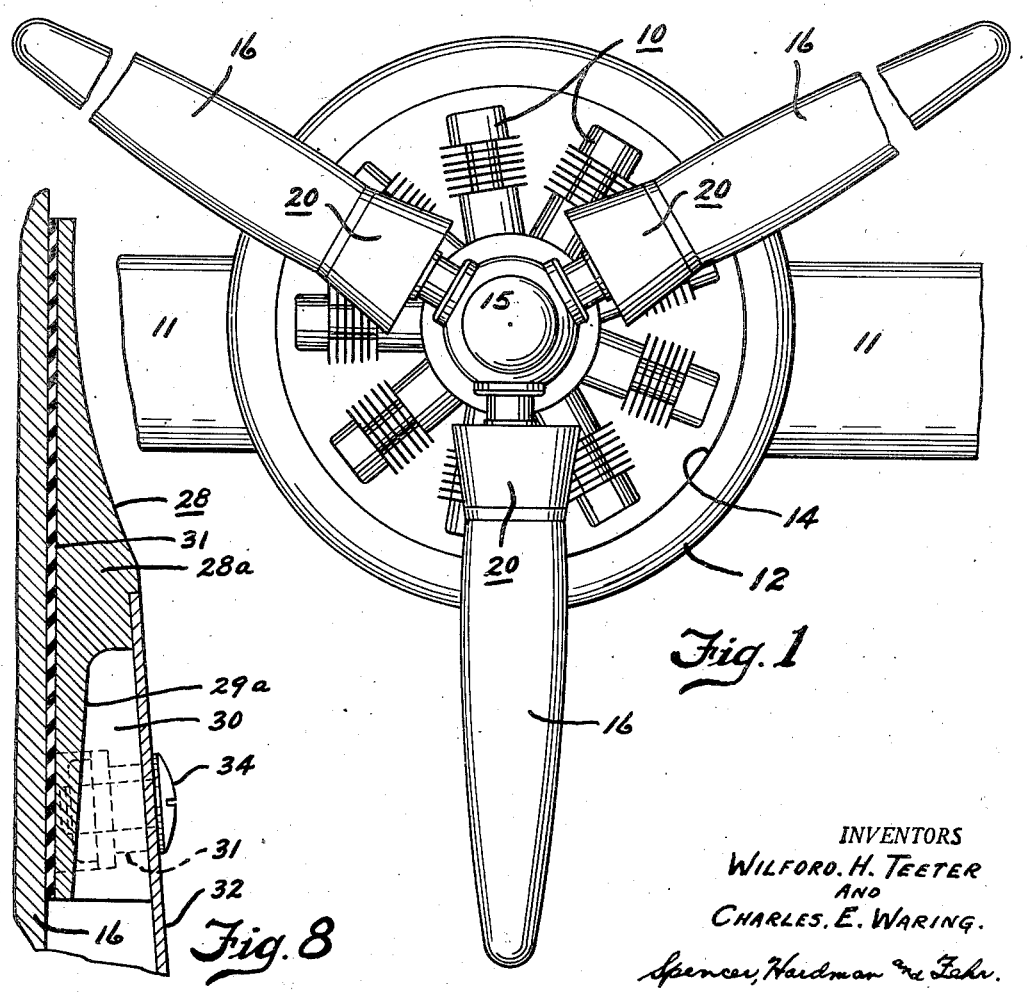

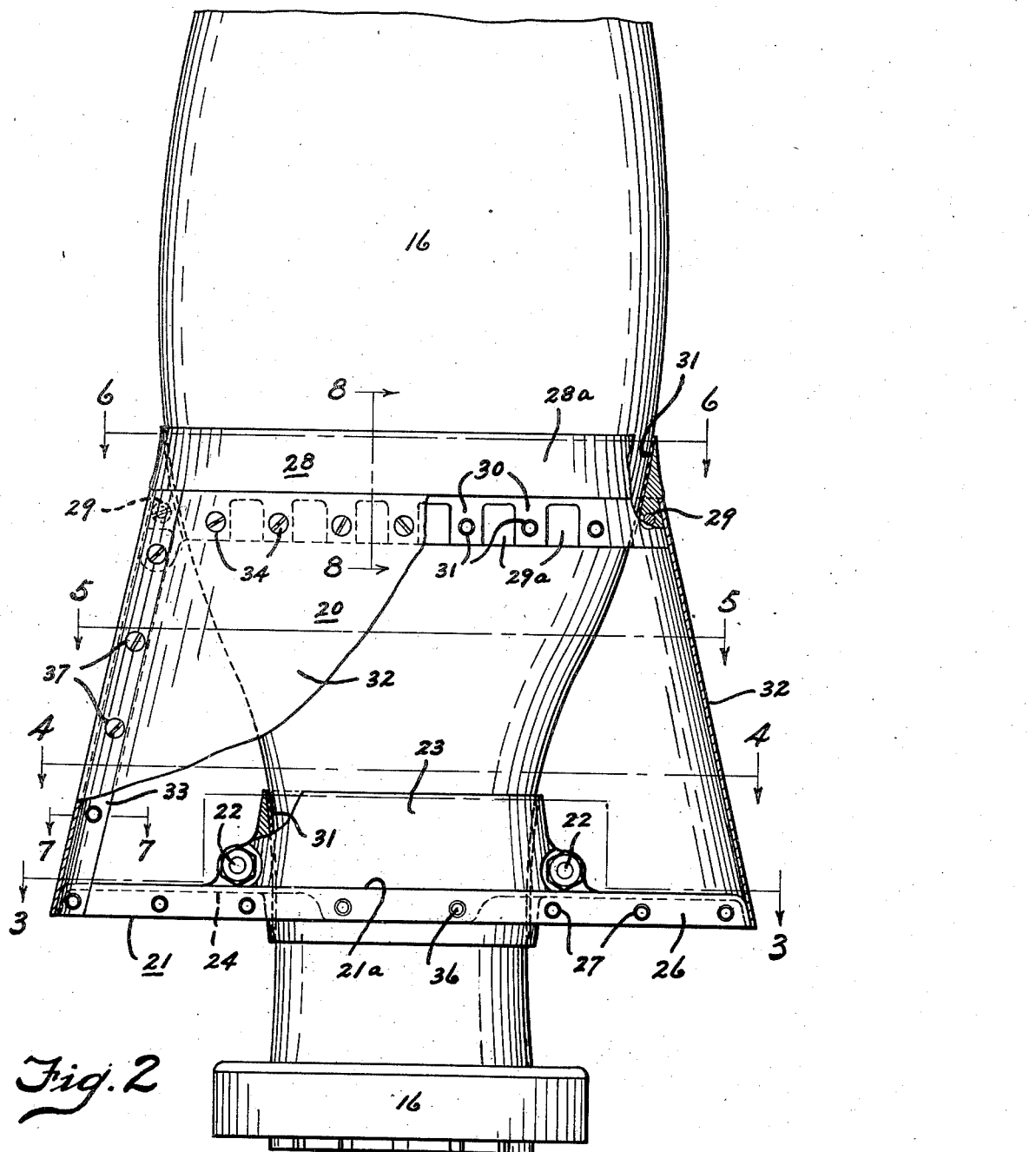

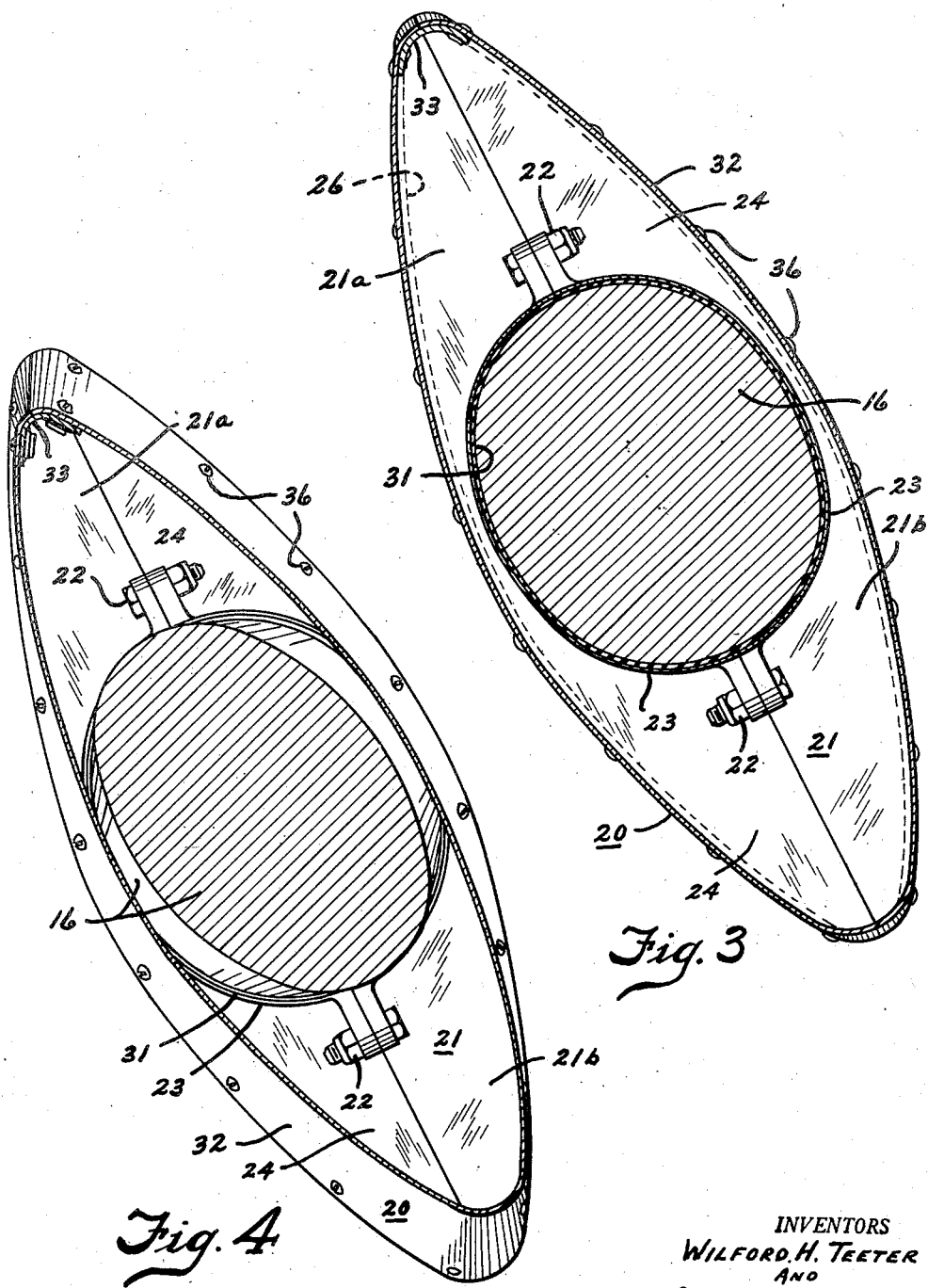

Patented Sept. 9, 1947

2,427,166

UNITED STATES PATENT OFFICE 2,427,166

PROPELLER BLADE FAIRING

Wilford H. Teeter, Dayton, and Charles E. Waring, Oakwood, Ohio, assignors to General Motors Corporation, Dayton, Ohio, a corporation of Delaware Application January 22, 1945, Serial No. 573,859

3 Claims. (Cl. 170—159)

1

This invention relates to airplanes and particularly to means for cooling engines thereof.

Airplanes such as large bombers must be concealed from aerial view of enemy planes and this concealment requires the use of a large area thus necessitating parking, storing or concealing the bombers at great distances from their take-off runway. Although air cooled engines of such airplanes may be effectively cooled during flight of the plane the engines are not sufficiently cooled upon taxiing the plane on the ground over great distances such, for example, as from their point of concealment to the take-off runway. When the airplane is taxied long distances over the ground under the power of its own engines, particularly in hot climatic regions, these engines due to the extreme load placed thereon and the high speed thereof become overheated. Overheating of the engines in this manner often results in damage to the engines which may or may not be discovered at the time the airplane reaches its take-off runway and is therefore frequently the cause of failure of an engine after the plane has attained flight.

It is an object of the present invention to provide means for effectively cooling air cooled engines of an airplane, particularly while the airplane is being taxied on and along the ground, to prevent damaging the engines and causing failure thereof.

It is another object of the present invention to provide means on a propeller of an airplane engine for creating a stream of air, separate from the normal air stream caused by the propeller blades, parallel to and closely adjacent the axis of rotation of the propeller and to utilize this additional or separate stream of air to cool the engine.

It is a further object of the present invention to provide means in the form of a cuff-like device or fairing which can be secured to the blades of an airplane engine propeller on the scene or at the place the airplane is stationed and which device will act as a fan or blower for creating a stream of air through the engine compartment and over the engine therein.

A still further object of the present invention is to provide light weight metal cuff-like devices or fairings on the blades of an airplane engine propeller and a means of securing the metal devices to the blades without adding stresses to or causing undue strain on the propeller blades.

A more specific object of the present invention is to secure a metallic cuff-like device or fairing to a blade of a propeller out of metal-to-metal contact therewith and against movement relative thereto by a thermoplastic bond.

Further objects and advantages of the present invention will be apparent from the following description, reference being had to the accompanying drawings, wherein a preferred form of the present invention is clearly shown.

In the drawings:

Fig. 1 is a front view of an air cooled engine mounted on the wing of an airplane and showing a propeller on the engine drive shaft having the present invention applied thereto;

Fig. 2 is an enlarged view, partly in section and partly in elevation, of a fairing mounted on a propeller blade;

Fig. 3 is a sectional view taken on the line 3—3 of Fig. 2 showing the contour of the fairing adjacent the hub part of the blade and the bond of the fairing inboard casting to the blade;

Fig. 4 is a sectional view taken on the line 4—4 of Fig. 2 showing the position of the fairing relative to the blade and their contours at that point;

Fig. 7 is an enlarged sectional view taken on the line 7—7 of Fig. 2 showing an attaching support for the ends of the sheath of the fairing; and Fig. 8 is an enlarged sectional view taken on the line 8—8 of Fig. 2 more clearly showing the bond between the fairing outboard casting and the blade.

Figures 5, 6:
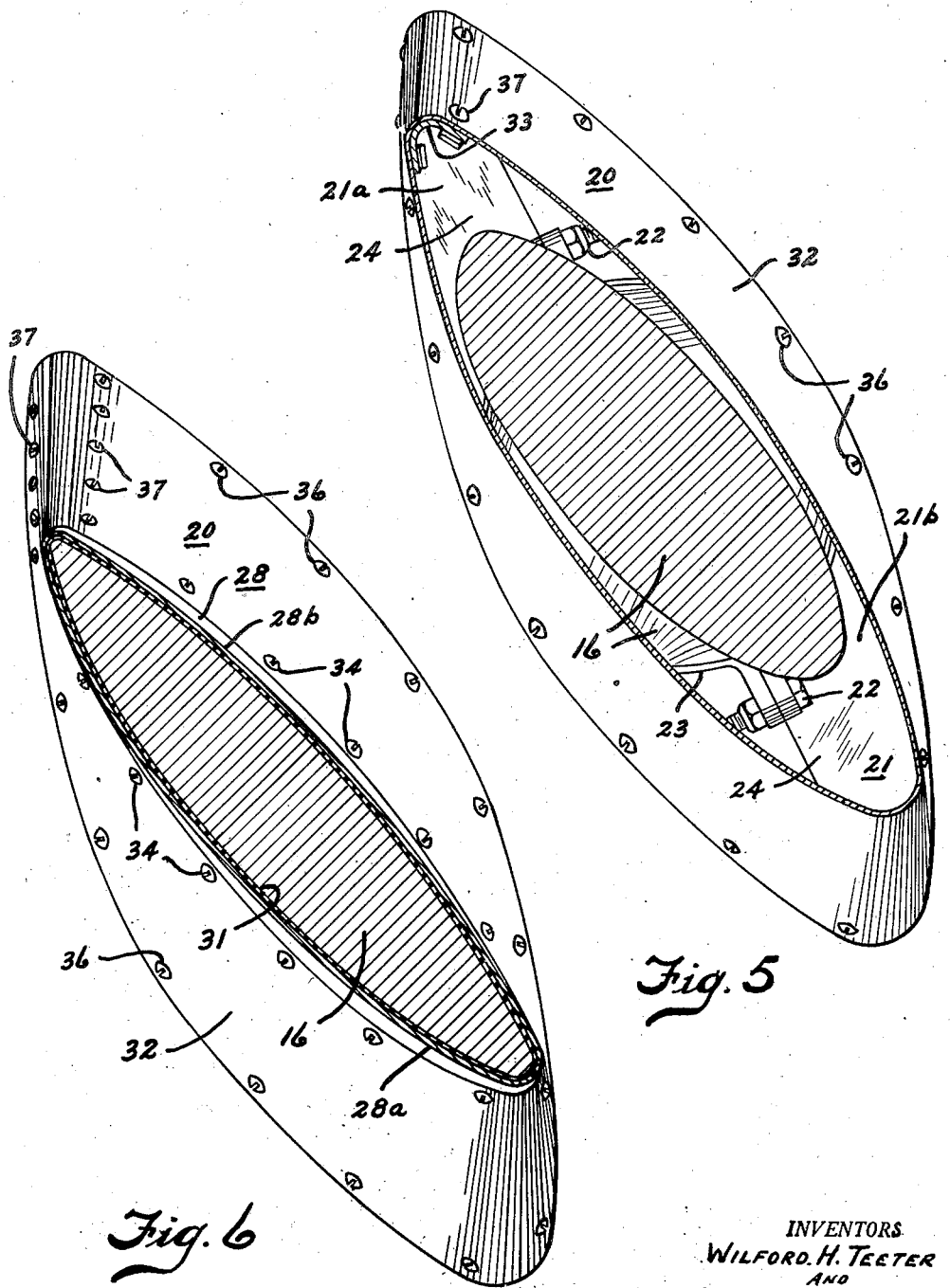
Fig. 5 is a sectional view taken on the line 5—5 of Fig. 2 showing the position of the fairing relative to the blade and their contours at that point.
Fig. 6 is a sectional view taken on the line 6—6 of Fig. 2 showing the contour of the fairing at a relatively flattened point of the blade and the bond of the fairing outboard casting to the blade.

Referring now to the drawings, for illustrating the present invention, there is shown in Fig. 1 thereof a representation of a radial type air cooled engine generally designated by the reference character 10 mounted on a vehicle or a wing 11 of an airplane. The engine 10 is cowled by or enclosed in a shroud 12 having an opening 14 by way of which air may enter the engine compartment to cool the engine. A propeller, having a hub 15 secured to the shaft of the engine 10 to be driven or rotated thereby, has metal blades 16 which normally produce a stream of air beyond the engine compartment for causing mobility of the vehicle or flight of the airplane. For the reasons hereinbefore set forth, it is desirous to provide means on the propeller blades 16 to create a stream of air intermediate the axis of rotation of the propeller and the stream of air normally caused by the propeller blades, preferably in front of the opening 14 of shroud 12, so that air will be directed into the engine compartment and over the engine 10 therein. This means in the present invention is in the form of cuff-like devices or fairings and preferably metallic cuff devices or fairings so as to better withstand weather conditions without being damaged. Such devices or fairings are generally designated by the reference character 20 in Fig. 1 and one of such devices is mounted on or carried by each blade 16 of the propeller. These cuff-like devices or fairings are substantially oval shape in cross-sectional contour and are located at an angle with respect to the path of rotation of the propeller blades 16 so as to provide the same with a leading edge and a trailing edge. The fairings thus serve as a fan or blower to create the stream of air adjacent the axis of rotation of the propeller and to direct this air over the engine 10, particularly while the airplane is being taxied on and along the ground.

It is to be understood that propeller blades usually have their final outer surface shape or contour formed or determined by the amount of grinding necessary to be performed thereon in order to balance one propeller blade with others in shape, weight, etc. In addition to a blade having irregular curved surface of different radii at various points of cross-sectional area along the length thereof, such blades may not be uniform with respect to one another in cross-sectional shape due to differences in the final grinding operation performed thereon. This renders it a difficult task to match any one portion of a blade surface as compared to this same portion of another blade surface with an element to be attached thereto. The irregularity in shape of certain portions of one blade relative to another, together with the fact that to bolt or secure an element in direct metal-to-metal contact with the blade, would cause or set up undue stresses or strains thereon necessitating the mounting of a fairing or similar device on a blade in a manner that it will be free of contacting the blade at any point.

Each cuff-like device or fairing 20 includes or comprises an inboard metal member 21 formed by bolting two aluminum parts or castings 21a and 21b together by bolts 22, (see Figs. 2 and 3). Each casting 21a and 21b of member 21 has an inner collar part 23 shaped to conform to the shank portion contour of the propeller blade 16 adjacent the hub of the propeller (see Fig. 3). A web or flat portion 24, formed integral with the collar part 23 of the two castings 21a and 21b, extends outwardly or laterally from the blade 16 and terminates in a peripheral flange 26 having threaded bushings or nuts 27 pressed in spaced apart holes provided around the flange. Each fairing 20 also includes or comprises an outboard metal member 28 formed by securing two aluminum parts or castings 28a and 28b together by screws 29. Each casting 28a and 28b of member 28 has an inner surface shaped to conform to the relatively flattened and curved contour of the blade 16 at the point where member 28 surrounds the blade (see Fig. 6). Each casting of member 28 is provided with a plurality of spaced apart undercut portions 29a to provide spaced lugs 30 which have threaded bushings or nuts 31 pressed into holes provided in the lugs (see Fig. 8) for a purpose to be presently described. The members 21 and 28, each comprising the two bolted together casting parts, are positioned with respect to their point of attachment to the propeller blade by a suitable locating fixture which holds the blade stationary relative to these members during final adjustment of the blade relative to these members. A clearance space is provided between the corresponding surfaces of inboard and outboard members 21 and 28 and the blade 16 after these members have been properly located with respect to the propeller blade 16 so that the metal fairing support members do not contact the metal blade. This clearance space allows for irregularities in the outer surface shape of one blade with respect to another, caused as has hereinbefore been pointed out, to insure a somewhat close but out of contact fit of the members 21 and 28 to any one of a plurality of blades. This clearance space or crevice also permits a putty-like plastic compound, employed to bond the members 21 and 28 to the propeller blade, to be filled therein.

Prior to the final locating and locking operation of blade 16 with respect to members 21 and 28 in the locating fixture, the surfaces of castings 21a and 21b of inboard member 21, surfaces of castings 28a and 28b of outboard member 28, and the surfaces of blade 16, which are to be bonded together by the plastic compound, are thoroughly cleaned by a suitable solvent. The solvent is then washed or wiped off these surfaces with alcohol and thereafter several coatings or layers of priming cement are applied thereto. This priming cement may comprise a chlorinated rubber compound which after being applied to the surfaces is permitted to dry. Thereafter one or more coatings or layers of a tying compound commonly referred to as a neoprene cement is applied over the priming coat on the surfaces and permitted to dry. The crevice intermediate the blade surfaces and surfaces of the members 21 and 28 to be secured to the blade are, while these members are positioned in the locating fixture, filled with a plastic compound commonly referred to as neoprene putty. This plastic compound includes approximately 85% solids, such as neoprene and a suitable plasticizing agent, and 15% solvent such as xylol and may if desired include an accelerating substance containing litharge. The blade 16 and members 21 and 28 while being held in place relative to one another by the locating fixture and with the plastic compound filling the crevice between the surfaces to be bonded together are then placed, as an assembly, in a vulcanizing oven. In this oven the plastic compound is heated and cured to thereby bond the members 21 and 28 to the exterior surface of blade 16. This vulcanizing operation may be carried out in temperatures and times according to the following examples:

| Temperature of oven | Time of cure |
| --- | --- |
| | Hours |
| Between 160° F. and 170° F. | 24 |
| Between 170° F. and 190° F. | 16 to 24 |
| Between 190° F. and 200° F. | 16 |

In this manner the two-part metal casting members 21 and 28 are firmly bonded to the propeller blade 16 and secured against movement relative thereto by a layer of rubber-like thermoplastic material generally represented by the reference character 31 (see Figs. 1, 3 and 6) without any metal-to-metal contact or clamping of the castings to the metal blade.

After thermoplastically bonding the members 21 and 28 to blade 16 and removing these members and the blade from the locating and vulcanizing fixture an aluminum preformed sheath 32 is slipped over and wrapped around the blade. A metal mounting or support bracket 33, for the ends of the sheath 32, is positioned so as to extend between the members 21 and 28 along the trailing edge of the fairing. One edge of sheath 32 is secured to the outboard metal member 28 by a plurality of screws 34 threaded into the nuts 31. The other edge of sheath 32 is secured to the flange 26 of inboard metal member 28 by a plurality of screws 36 threaded into the nuts 27. The ends of sheath 32 are secured to the bracket 33, at the trailing edge of the fairing 20, by screws 37 threaded in studs or nuts 38 carried by the support element or bracket 33 (see Fig. 7). Certain of the screws 37 pass through the bracket element 33 and engage certain of the nuts 27 and 31 carried by the members 21 and 28 respectively to secure the element 33 in place along the trailing edge of the fairing 20. Sheath 32 thereby encloses or forms a collar around that portion of the propeller intermediate the inboard and outboard members 21 and 28 respectively to provide a fairing 20. The sheath or collar 32 of each fairing mounted on the propeller blades thus serves to create an air stream, during rotation of the propeller, and this stream of air is directed into the engine compartment, through the opening 14 in shroud 12, to thereby cool the engine 10.

From the foregoing it will be seen that an improved cuff or fairing is provided on the blades of an airplane propeller. The improved fairing is light in weight and therefore its installation on blades of an airplane propeller entirely out of metal-to-metal contact therewith does not create additional or undue strains or stresses on the blades. Due to the light weight of the improved fairing and the fact that it is mounted closely adjacent the axis of rotation of the propeller it does not materially interfere with the balance of airplane propellers. Bonding of the fairing to blades of existing propellers may be readily carried out on the scene or at the station of airplanes near a battle front because the vulcanizing and/or curing of the bonding or plastic material may be carried out in ordinary ovens since extremely high temperatures are not involved and special factory-like equipment is not necessary. Cooling of engines of an airplane is accomplished by the present invention without materially increasing the weight of an airplane propeller and damage to or failure of the engines during taxiing of the airplane on and along the ground over great distances is avoided.

While the form of embodiment of the invention as herein disclosed constitutes a preferred form, it is to be understood that other forms might be adopted, as may come within the scope of the claims which follow.

What is claimed is as follows:

1. In combination, a propeller blade having curved outer surfaces of different radii at various points of cross-sectional area along the length thereof, a fairing carried by said blade, said fairing including an inboard member and an outboard member spaced from one another along the blade, each of said members having an inner surface portion of different contour relative to one another and substantially conforming to and closely encircling portions of the outer surfaces of said blade in spaced relation thereto, means for mounting said members on said blade entirely out of contact therewith, said means comprising a plastic material disposed in the space intermediate said portions of said blade and said encircling portions of said members, said plastic material being bonded to said portions of said blade and to said encircling portions of said members to prevent twisting thereof relative to said blade and longitudinal movement thereof along the blade, and said fairing also including a sheath having one of its edges secured to said inboard member and its other edge secured to said outboard member for enclosing the blade intermediate said members.

2. In combination, a metallic propeller blade having curved outer surfaces of different radii at various points of cross-sectional area along the length thereof, a hollow fairing carried by said blade, said fairing including a metallic inboard member and a metallic outboard member spaced from one another along the blade, each of said members having an inner surface portion of different contour relative to one another and substantially conforming to and closely encircling portions of the outer surfaces of said blade in spaced relation thereto, means for mounting said metallic members on said blade entirely out of metal-to-metal contact therewith, said means comprising a plastic material disposed in the space intermediate said portions of said blade and said encircling portions of said members, said plastic material being bonded to said portions of said blade and to said encircling portions of said members to prevent twisting thereof relative to said blade and longitudinal movement thereof along the blade, and said fairing including a one-piece metallic sheath having one of its edges secured to said inboard member, its other edge secured to said outboard member for enclosing the blade intermediate said members and having its ends secured together at the trailing edge of said fairing.

3. In combination, a propeller blade, a fairing carried by said blade, said fairing including an inboard member and an outboard member, means for mounting said members in spaced apart relation on the blade and entirely out of contact therewith, each of said members of said fairing having inner surface portions substantially conforming to and encircling outer surface portions of said blade in spaced relation thereto, said mounting means comprising a plastic material disposed in the space intermediate said surface portions of said blade and said encircling portions of said members and being bonded to said surface portions for securing said members to said propeller, and said fairing also including a sheath secured to said members and enclosing that portion of said blade disposed therebetween.

WILFORD H. TEETER.
CHARLES E. WARING.

REFERENCES CITED

The following references are of record in the file of this patent:

UNITED STATES PATENTS

| Number | Name | Date |
|---|---|---|
| 2,133,253 | Myers | Oct. 11, 1938 |
| 2,313,491 | Lemoigne | Mar. 9, 1943 |
| 2,330,622 | Ramshorn | Sept. 28, 1943 |
| 2,017,207 | Hathorn | Oct. 15, 1935 |
| 2,289,400 | Woods | July 14, 1942 |
| 2,309,466 | Martin | Jan. 26, 1943 |
| 2,151,216 | Larsen | Mar. 21, 1939 |
| 2,304,718 | Swart | Dec. 8, 1942 |

FOREIGN PATENTS

| Number | Country | Date |
|---|---|---|
| 551,556 | Great Britain | Mar. 1, 1943 |